United States Patent
Cors et al.

(10) Patent No.: US 7,506,067 B2
(45) Date of Patent: Mar. 17, 2009

(54) METHOD AND APPARATUS FOR IMPLEMENTING SERVICE REQUESTS FROM A COMMON DATABASE IN A MULTIPLE DHCP SERVER ENVIRONMENT

(75) Inventors: Josep Cors, Rochester, MN (US); Chung Meng, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 492 days.

(21) Appl. No.: 11/191,403

(22) Filed: Jul. 28, 2005

(65) Prior Publication Data

US 2007/0027963 A1 Feb. 1, 2007

(51) Int. Cl.
  G06F 15/16 (2006.01)
  G06F 15/173 (2006.01)
(52) U.S. Cl. .................. 709/245; 707/102; 709/219; 709/226
(58) Field of Classification Search .......... 709/245, 709/227, 228, 229, 238
  See application file for complete search history.

(56) References Cited

U.S. PATENT DOCUMENTS

| | | | |
|---|---|---|---|
| 5,922,049 A | | 7/1999 | Radia et al. |
| 5,974,453 A * | | 10/1999 | Andersen et al. ............ 709/220 |
| 6,212,563 B1 * | | 4/2001 | Beser .......................... 709/227 |
| 6,226,684 B1 | | 5/2001 | Sung et al. |
| 6,298,383 B1 | | 10/2001 | Gutman et al. |
| 6,374,295 B2 * | | 4/2002 | Farrow et al. ................ 709/223 |
| 6,564,216 B2 * | | 5/2003 | Waters ......................... 707/10 |
| 6,609,154 B1 * | | 8/2003 | Fuh et al. ..................... 709/225 |
| 7,254,630 B1 * | | 8/2007 | Daude et al. ................. 709/224 |
| 7,275,107 B1 * | | 9/2007 | Barker ......................... 709/227 |
| 2003/0163341 A1 * | | 8/2003 | Banerjee et al. .................. 705/1 |
| 2004/0267949 A1 | | 12/2004 | Rover et al. |
| 2005/0044265 A1 | | 2/2005 | Vinel et al. |
| 2006/0036733 A1 * | | 2/2006 | Fujimoto et al. ............ 709/225 |
| 2006/0218388 A1 * | | 9/2006 | Zur et al. ...................... 713/2 |

OTHER PUBLICATIONS

Bernard Aboba, Network Working Group, Internet Draft, "The Mini-DHCP Server", Oct. 4, 2000, pp. 1-8, (http://www.6ants.net/doc/draft/draft-aboba-dhc-mini-02.txt).

* cited by examiner

*Primary Examiner*—Joseph E Avellino
*Assistant Examiner*—Shaq Taha
(74) *Attorney, Agent, or Firm*—Joan Pennington

(57) ABSTRACT

A method and apparatus are provided for implementing service requests from a common database in a multiple dynamic host configuration protocol (DHCP) server environment. A DHCP authorization cache is provided to implement synchronized access for the multiple DHCP servers to the common database. The DHCP authorization cache includes a plurality of elements, each element for storing a plurality of entries including a client identifier, an ISCSI DHCP router pointer, an ISCSI DHCP router pointer alternate, and a timestamp and the DHCP authorization cache includes an entry pointer initially set to zero.

6 Claims, 6 Drawing Sheets

106

| 200 | | | |
|---|---|---|---|
| CLIENT IDENTIFIER ENTRY 0 | ISCSI DHCP ROUTER POINTER | ISCSI DHCP ROUTER POINTER ALTERNATE | TIMESTAMP |
| 202 | 204 | 206 | 208 |

*
*
*

| 200 | | | |
|---|---|---|---|
| CLIENT IDENTIFIER ENTRY 31 | ISCSI DHCP ROUTER POINTER | ISCSI DHCP ROUTER POINTER ALTERNATE | TIMESTAMP |
| 202 | 204 | 206 | 208 |

ENTRY POINTER = 0
210

FIG. 2

1. SET ALL CACHE ENTRIES TO ZERO
2. SET ENTRY POINTER TO ZERO
300

FIG. 3

1. INSERT CLIENT IDENTIFIER INTO THE CACHE SLOT POINTED TO BY THE ENTRY POINTER.
2. SET THE ISCSI DHCP SERVER POINTER IN THE CACHE ENTRY TO THE SEARCH VALUE.
3. SET THE TIMESTAMP POINTER IN THE CACHE ENTRY TO THE CURRENT TIME.
4. SET THE ISCSI DHCP SERVER POINTER ALTERNATE POINTER IN THE CACHE ENTRY TO ZERO.
5. INCREMENT THE ENTRY POINTER BY ONE. IF ENTRY POINTER = 32, SET TO ZERO.
500

RETURN SUCCESS
502

METHOD AND APPARATUS FOR IMPLEMENTING SERVICE REQUESTS FROM A COMMON DATABASE IN A MULTIPLE DHCP SERVER ENVIRONMENT

FIELD OF THE INVENTION

The present invention relates generally to the data processing field, and more particularly, relates to a method and apparatus for implementing service requests from a common database in a multiple dynamic host configuration protocol (DHCP) server environment.

DESCRIPTION OF THE RELATED ART

Request for Comments (RFC) 2131 describes the Dynamic Host Configuration Protocol (DHCP). DHCP provides a framework for passing configuration information to hosts on a transmission control protocol/Internet protocol (TCP/IP) network. DHCP is based on the Bootstrap Protocol (BOOTP), adding the capability of automatic allocation of reusable network addresses and additional configuration options. DHCP automatically assigns an IP address to a target device logging onto a TCP/IP network, eliminating the need for manually assigning permanent IP addresses.

When multiple Internet small computer system interface (ISCSI) host bus adapters (HBAs) are installed in a system, a broadcast storm may be caused by a response of a mini-DHCP server to an initiator's DHCP packet. The broadcast storm may occur because each ISCSI adapter port has its own IP stack and can be viewed as a unique DHCP server.

A need exists for an effective mechanism for implementing service requests from a common database in a multiple dynamic host configuration protocol (DHCP) server environment.

SUMMARY OF THE INVENTION

Principal aspects of the present invention are to provide a method and apparatus for implementing service requests from a common database in a multiple dynamic host configuration protocol (DHCP) server environment. Other important aspects of the present invention are to provide such method and apparatus for implementing service requests from a common database in a multiple dynamic host configuration protocol (DHCP) server environment substantially without negative effect and that overcome many of the disadvantages of prior art arrangements.

In brief, a method and apparatus are provided for implementing service requests from a common database in a multiple dynamic host configuration protocol (DHCP) server environment. A DHCP authorization cache is provided to implement synchronized access for the multiple DHCP servers to the common database. The DHCP authorization cache includes a plurality of elements, each element for storing a plurality of entries including a client identifier, an ISCSI DHCP router pointer, an ISCSI DHCP router pointer alternate, and a timestamp. The DHCP authorization cache includes an entry pointer initially set to zero. A first DHCP server to query the DHCP authorization cache for a particular client identifier is returned an authorization success to serve the particular client identifier for a first time period, such as two seconds. After the first time period, such as after two seconds, if other DHCP servers query the DHCP authorization cache with the particular client identifier, then the first DHCP server to query the DHCP authorization cache for a particular client identifier is required to wait a second time period, such as one second before being returned the authorization success to serve the particular client identifier for the first time period.

BRIEF DESCRIPTION OF THE DRAWINGS

The present invention together with the above and other objects and advantages may best be understood from the following detailed description of the preferred embodiments of the invention illustrated in the drawings, wherein:

FIG. 2 is a block diagram illustrating a DHCP authorization cache of the multiple DHCP server network system apparatus of FIG. 1 for implementing methods to service requests from a common database in accordance with the preferred embodiment;

FIG. 3 is a flow chart illustrating initial program load (IPL) initialization of the DHCP authorization cache of FIG. 2 in accordance with the preferred embodiment; and FIGS. 4, 5, 6, and 7 are flow charts illustrating function of the DHCP authorization cache of FIG. 2 in accordance with the preferred embodiment.

DETAILED DESCRIPTION OF THE PREFERRED EMBODIMENTS

Figure 1:
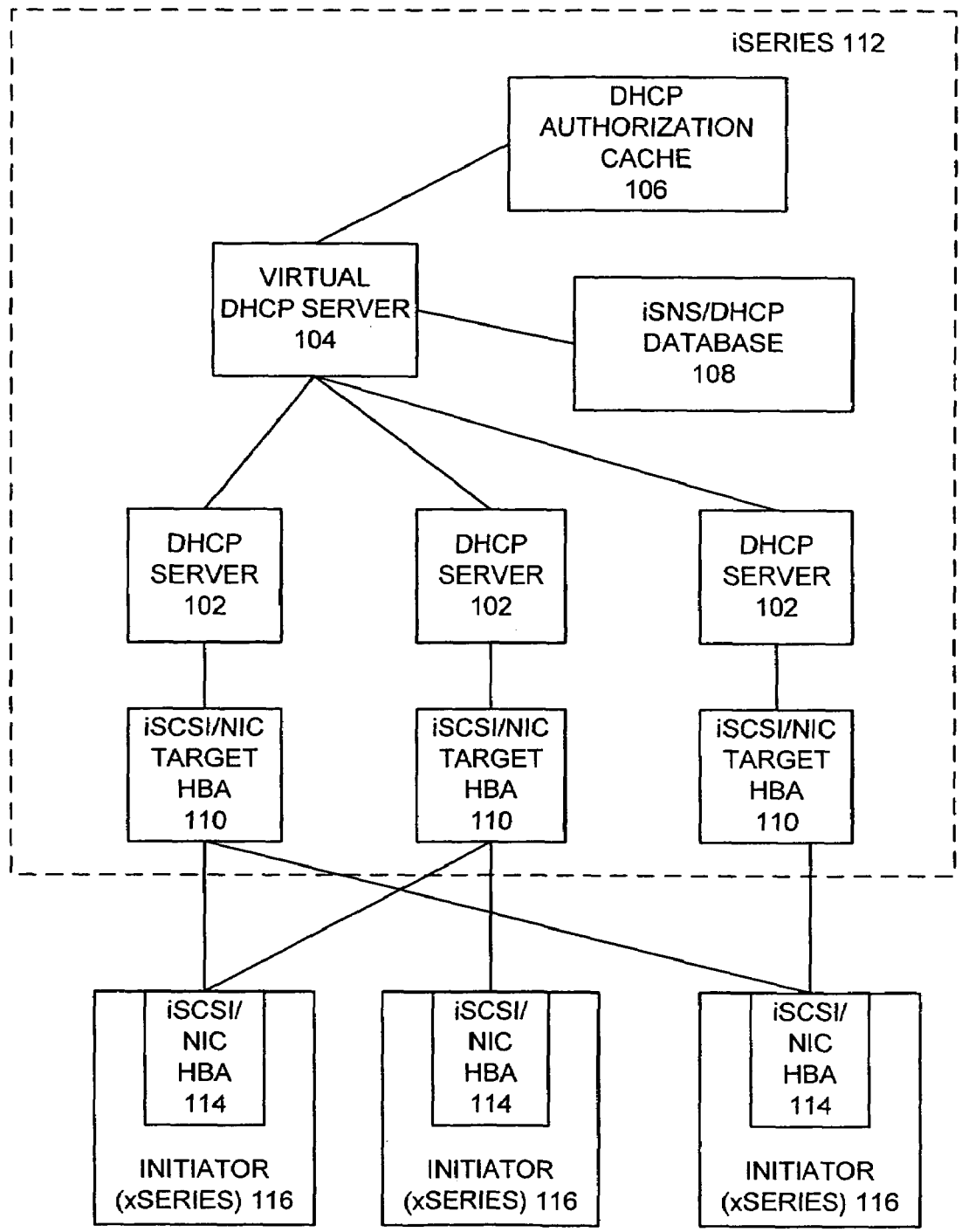
FIG. 1 is a block diagram illustrating a multiple dynamic host configuration protocol (DHCP) server network system including apparatus for implementing methods to service requests from a common database in accordance with the preferred embodiment.

Having reference now to the drawings, in FIG. 1, there is shown a multiple dynamic host configuration protocol (DHCP) server network system generally designated by the reference character 100 for implementing methods to service requests from a common database in accordance with the preferred embodiment. Multiple DHCP server network system 100 illustrates an exemplary environment for implementing methods to service requests from a common database in accordance with the preferred embodiment.

Multiple DHCP server network system 100 includes a plurality of DHCP servers 102, each coupled to a virtual DHCP server 104. Multiple DHCP server system 100 includes a DHCP authorization cache 106 in accordance with the preferred embodiment coupled to the virtual DHCP server 104 for implementing synchronized access to an Internet storage name server (iSNS) DHCP database 108 by the multiple DHCP servers 102 to supply boot parameters for a respective iSCSI network interface card (NIC) target host bus adapter (HBA) 110. Each iSCSI NIC target HBA 110 is coupled to a respective one of the DHCP servers 102 included in a server system 112, such as an iSeries® server system manufactured and sold by International Business Machines Corporation of Armonk, N.Y.

Each of the multiple DHCP servers 102 functions as a router to the virtual DHCP server 104. In the cache algorithm in accordance with the preferred embodiment, as illustrated and described with respect to FIGS. 2-7, the DHCP server 102 is referred to as the DHCP router. Each iSCSI NIC target HBA 110 is a multi-function adapter having a NIC function, transmit Tx and receive Rx for the DHCP server 102. The DHCP authorization cache 106 implements the algorithm that controls access to the iSNS DHCP database 108.

The virtual DHCP server 104 is the DHCP server accessing a partition wide database defined by the iSNS DHCP database 108. The iSNS DHCP database 108 contains data objects with data common to iSNS (iSCSI name server) and the multiple DHCP servers 102.

An iSCSI NIC HBA 114 in an initiator 116, such as an xSeries® server manufactured and sold by International Business Machines Corporation of Armonk, N.Y., is a boot device. The iSCSI NIC HBA 114 includes firmware having DHCP client code requesting the boot parameters.

Referring now to FIG. 2, there is shown an exemplary DHCP authorization cache 106 of the apparatus of multiple DHCP server network system 100 for implementing methods to service requests from a common database in accordance with the preferred embodiment. DHCP authorization cache 106 in accordance with the preferred embodiment includes a plurality of elements 200, for example elements 200, 0-31. Each element 200 of the DHCP authorization cache 106 has a plurality of entries includes a client identifier 202, an ISCSI DHCP router pointer 204, an ISCSI DHCP router pointer alternate 206, and a timestamp 208. DHCP authorization cache 106 in accordance with the preferred embodiment includes an entry pointer 210 initially set to zero.

Referring now to FIG. 3, there is shown an exemplary initial program load (IPL) initialization of the DHCP authorization cache 106 in accordance with the preferred embodiment. As indicated in a block 300, first all cache entries of elements 200 including the client identifier 202, the ISCSI DHCP router pointer 204, the ISCSI DHCP router pointer alternate 206, and the timestamp 208 are set to zero or NULL. Second the entry pointer 210 or entry counter that wraps after reaching 31 for elements 200, 0-31 is initialized to zero.

In accordance with features of the preferred embodiments, an absolute time difference is used to permit automatic recovery from timestamp corruption by just waiting a set period of time, for example, 2 seconds. In the event of a DHCP server fails while granted authorization, automatic recovery to an alternate server is enabled by just waiting for a period of time, for example, 2 seconds.

FIGS. 4, 5, 6, and 7 are flow charts illustrating functions of the DHCP authorization cache 106 in accordance with the preferred embodiment.

Figure 4:
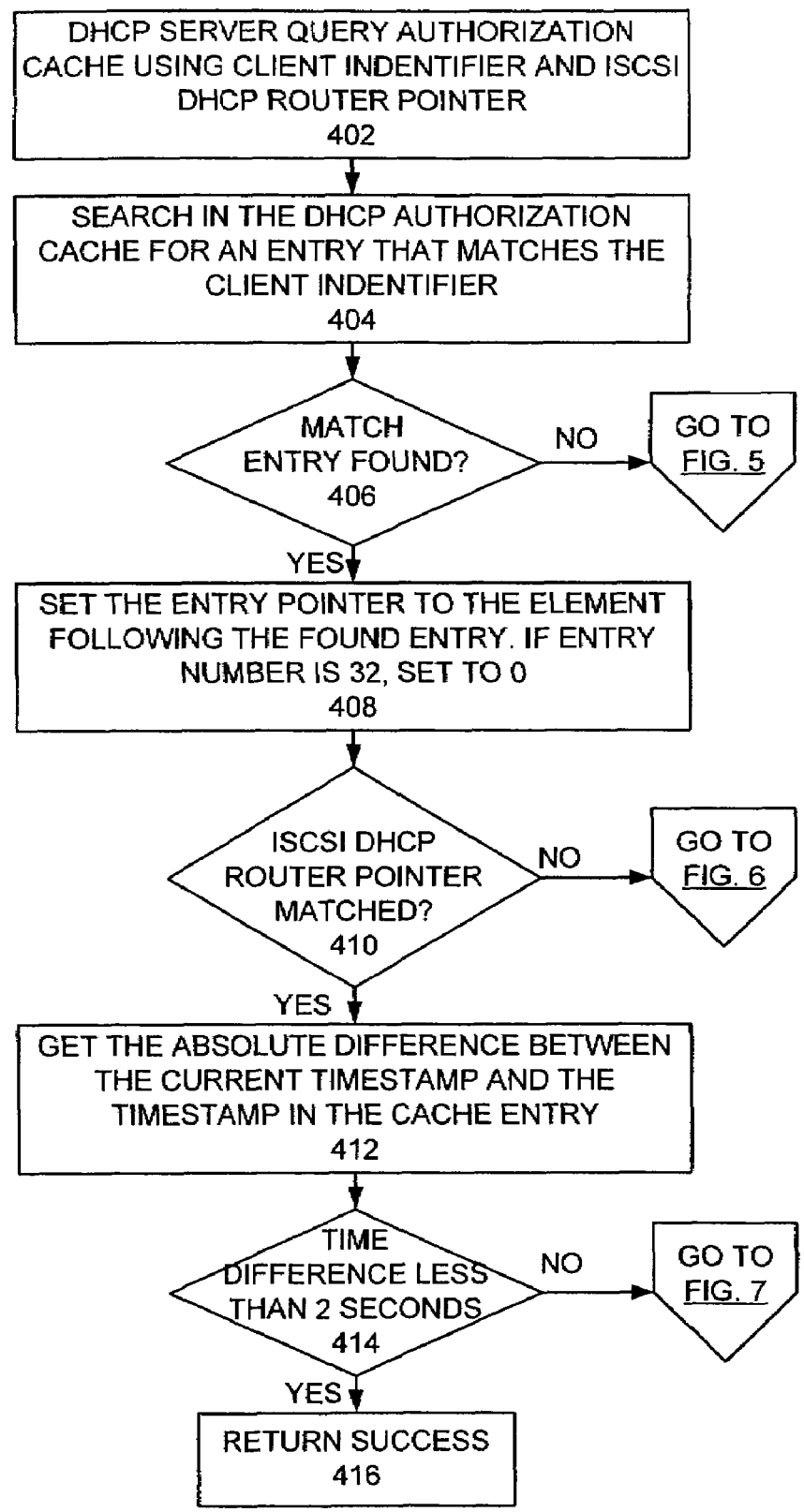

Referring now to FIG. 4, there are shown exemplary steps of the functions of the DHCP authorization cache 106 in accordance with the preferred embodiment. As indicated in a block 402, a DHCP server 102 will query the DHCP authorization cache 106 using the client identifier as the key and passing in the pointer to the ISCSI DHCP router object. The DHCP authorization cache 106 using the client identifier as the key for an entry client identifier 202 that matches the key client identifier as indicated in a block 404.

Checking for a match is performed as indicated in a decision block 406. If a match is not found, then the exemplary steps go to FIG. 5. If a match of an entry client identifier 202 with the key client identifier is found, then the entry pointer 210 is set to the element 200 following the found entry 202 as indicated in a block 408. If the entry number is 32, using the exemplary elements 200, 0-31, then the entry pointer 210 is set to zero.

Next checking for a match of the corresponding ISCSI DHCP router pointer 204 is performed as indicated in a decision block 410. If a match of the corresponding ISCSI DHCP router pointer 204 is not found, then the exemplary steps go to FIG. 6.

When a match of the corresponding ISCSI DHCP router pointer 204 also is found, then an absolute difference between the current timestamp and the timestamp 208 in the cache element 200 is identified as indicated in a block 412.

Checking whether the time difference is less than 2 seconds if performed as indicated in a decision block 414. If the time difference is not less than 2 seconds, then the exemplary steps go to FIG. 7. When the time difference is less than 2 seconds, then an authorization success is returned as indicated in a block 416.

Referring now to FIG. 5, when a match of an entry client identifier 202 with the key client identifier is not found at decision block 406 in FIG. 4, then as indicated in a block 500 an entry is added into the DHCP authorization cache 106 in the slot pointed to by the counter or entry pointer 210. As shown in block 500, first the client identifier is inserted into the DHCP authorization cache 106 in the slot pointed to by the counter or entry pointer 210. Second, the ISCSI DHCP router pointer 204 in the cache entry 200 is set to the search value. Third, the timestamp 208 in the cache entry is set to the current time Fourth, the ISCSI DHCP router pointer alternate 206 is set to zero. Fifth, the entry pointer 210 is incremented by one, and if the entry number is 32, using the exemplary elements 200, 0-31, then the entry pointer 210 is set to zero. Then an authorization success is returned as indicated in a block 502.

Figure 6:
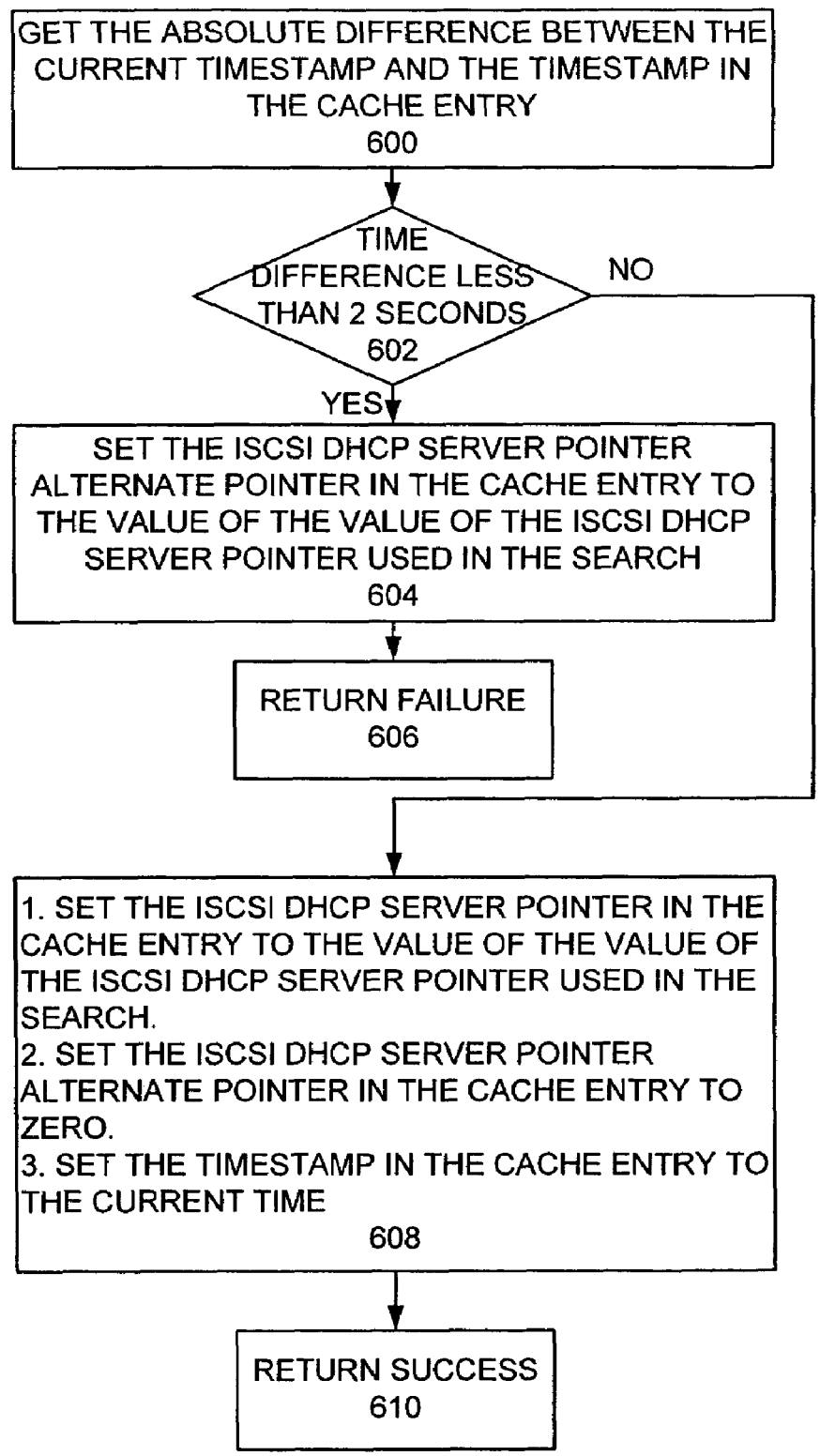

Referring now to FIG. 6, when a match of the client identifier is found, but a corresponding ISCSI DHCP router pointer 204 is not found at decision block 410 in FIG. 4, then an absolute difference between the current timestamp and the timestamp 208 in the cache element 200 is identified as indicated in a block 600. Checking whether the time difference is less than 2 seconds is performed as indicated in a decision block 602. If the time difference is less than 2 seconds, then the ISCSI DHCP router pointer alternate 206 is set to the ISCSI DHCP router pointer used in the search as indicated in a block 604. Then an authorization failure is returned as indicated in a block 606.

If the time difference is not less than 2 seconds, then the ISCSI DHCP router pointer 204 in the cache entry is set to the ISCSI DHCP router pointer used in the search as indicated in a block 608, the ISCSI DHCP router pointer alternate 206 in the cache entry is set to zero, and the timestamp 208 in the cache entry is set to the current time. Then an authorization success is returned as indicated in a block 610.

Figure 7:
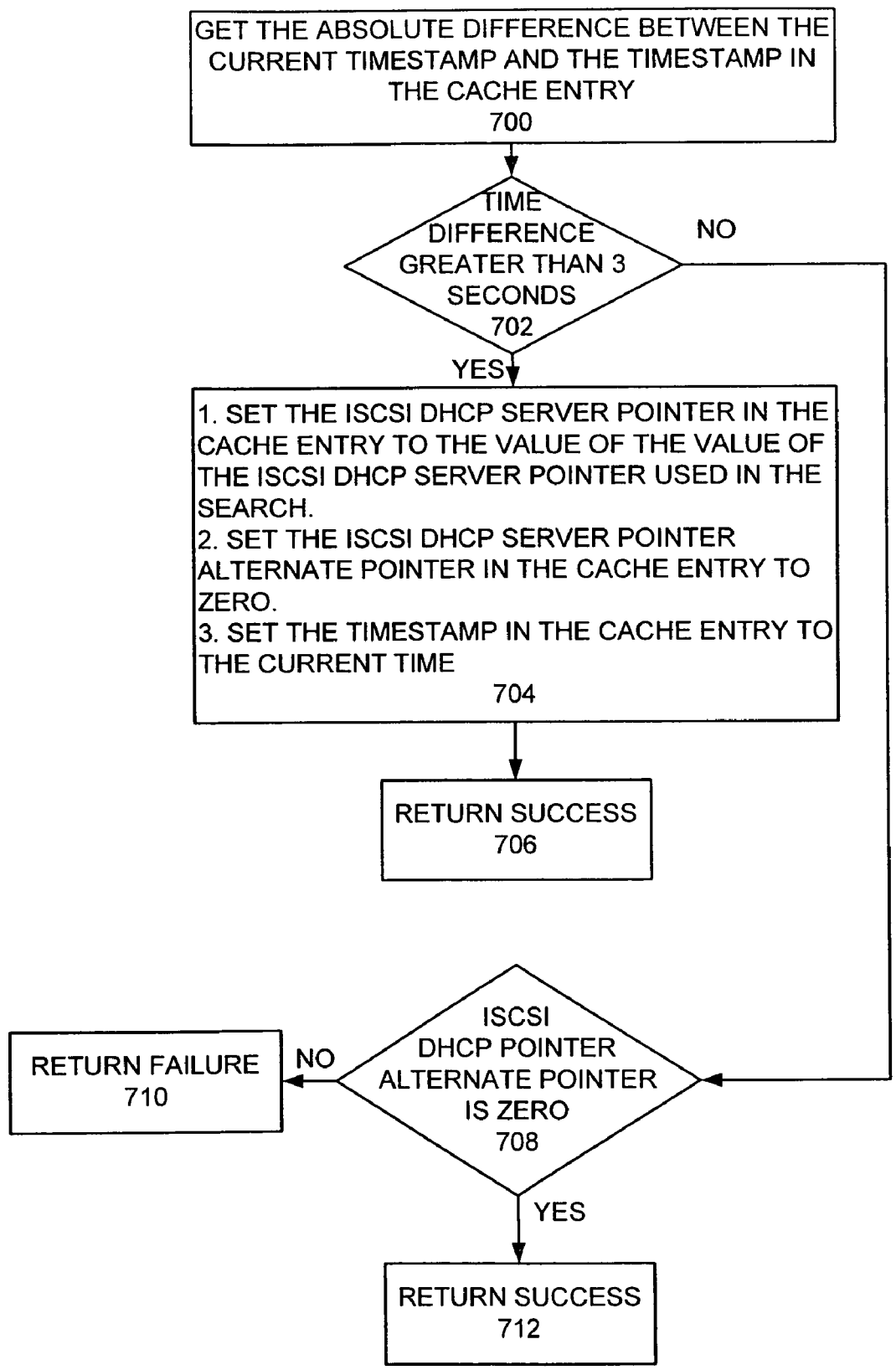

Referring now to FIG. 7, when the time difference found at decision block 414 in FIG. 4 is not less than 2 seconds, then an absolute difference between the current timestamp and the timestamp 208 in the cache element 200 is identified as indicated in a block 700. Checking whether the time difference is greater than 3 seconds is performed as indicated in a decision block 702. If the time difference is greater than 3 seconds, then as indicated in a block 704 the ISCSI DHCP router pointer 204 in the cache entry is set to the ISCSI DHCP router pointer used in the search, the ISCSI DHCP router pointer alternate 206 in the cache entry is set to zero, and the timestamp 208 in the cache entry is set to the current time. Then an authorization success is returned as indicated in a block 706.

Otherwise, when the time difference is not greater than 3 seconds, then as indicated in a decision block 708, checking is performed to determine if the ISCSI DHCP router pointer alternate 206 in the cache entry is zero. It the ISCSI DHCP router pointer alternate 206 in the cache entry is not zero, then an authorization failure is returned as indicated in a block 710. Otherwise, when the ISCSI DHCP router pointer alternate 206 in the cache entry is zero, then an authorization success is returned as indicated in a block 712.

While the present invention has been described with reference to the details of the embodiments of the invention shown in the drawing, these details are not intended to limit the scope of the invention as claimed in the appended claims.

What is claimed is:

1. Apparatus for implementing service requests from a common database in a multiple DHCP environment including multiple DHCP servers and multiple Internet small computer systems interface (ISCSI) adapters, said apparatus comprising:

a plurality of said DHCP servers;

each of a plurality of said ISCSI adapters being connected to respective one of said plurality of DHCP servers; said ISCSI adapters including a plurality of target host bus adapters (HBAs);

a plurality of Initiator ISCSI host bus adapters (HBAs) coupled to multiple ISCSI target host bus adapters;

a DHCP authorization cache for implementing synchronized access for said plurality of said DHCP servers to the common database;

said DHCP authorization cache includes a plurality of elements, each element for storing a plurality of entries including a client identifier, an ISCSI DHCP router pointer, an ISCSI DHCP router pointer alternate, and a timestamp; and said DHCP authorization cache includes an entry pointer;

a virtual DHCP server coupled to said plurality of said DHCP servers and said DHCP authorization cache; said virtual DHCP server for querying said DHCP authorization cache for a particular client identifier and returning an authorization success to a first DHCP server to serve the particular client identifier for a first time period, and responsive to other DHCP servers querying said DHCP authorization cache with the particular client identifier after the first time period, requiring the first DHCP server to wait a second time period before returning said authorization success to serve the particular client identifier;

said virtual DHCP server queries said DHCP authorization cache using the particular client identifier as a key, and passes in a ISCSI DHCP router pointer of the DHCP server for the query;

said virtual DHCP server responsive to identifying a match of a client identifier entry with the particular client identifier used as the key, checks for a corresponding matching entry of said ISCSI DHCP router pointer with said ISCSI DHCP router pointer of the DHCP server for the query;

said virtual DHCP server responsive to identifying a corresponding matching entry of said ISCSI DHCP router pointer with said ISCSI DHCP router pointer of the DHCP server for the query, identifies an absolute difference in time between a current time and said timestamp; and said virtual DHCP server responsive to identifying said absolute difference in time greater than said first time period and less than said second time period, returns an authorization failure to the first DHCP server.

2. Apparatus for implementing service requests from a common database in a multiple DHCP environment as recited in claim 1 wherein said DHCP authorization cache includes thirty-two elements, 0-31 and wherein said entry pointer is a counter wrapping after reaching entry 31 to entry 0.

3. Apparatus for implementing service requests from a common database in a multiple DHCP environment as recited in claim 1 wherein each of said plurality of entries including said client identifier, said ISCSI DHCP router pointer, said ISCSI DHCP router pointer alternate, and said timestamp and said entry pointer of said DHCP authorization cache are initialized to zero on initial program load (IPL).

4. Apparatus for implementing service requests from a common database in a multiple DHCP environment as recited in claim 1 wherein said first time period is approximately two seconds.

5. Apparatus for implementing service requests from a common database in a multiple DHCP environment as recited in claim 1 wherein said second time period is approximately one second.

6. Apparatus for implementing service requests from a common database in a multiple DHCP environment as recited in claim 1 wherein the particular client identifier is included in an Initiator DHCP request.

* * * * *